(12) United States Patent
Haim

(10) Patent No.: US 12,236,176 B2
(45) Date of Patent: *Feb. 25, 2025

(54) SYSTEM AND METHOD FOR TRACE GENERATION AND RECONFIGURATION ON A BREADBOARD OR PRINTED CIRCUIT BOARD

(71) Applicant: Albert Moses Haim, Potomac, MD (US)

(72) Inventor: Albert Moses Haim, Potomac, MD (US)

(*) Notice: Subject to any disclaimer, the term of this patent is extended or adjusted under 35 U.S.C. 154(b) by 442 days.

This patent is subject to a terminal disclaimer.

(21) Appl. No.: 17/832,069

(22) Filed: Jun. 3, 2022

(65) Prior Publication Data

US 2023/0397339 A1 Dec. 7, 2023

Related U.S. Application Data

(63) Continuation of application No. 17/500,804, filed on Oct. 13, 2021, now Pat. No. 11,363,713.

(51) Int. Cl.
| | | |
|---|---|---|
| *G06F 30/31* | (2020.01) | |
| *G06F 30/12* | (2020.01) | |
| *G06F 30/30* | (2020.01) | |
| *G06F 30/398* | (2020.01) | |
| *H05K 3/00* | (2006.01) | |
| *G06F 115/12* | (2020.01) | |

(52) U.S. Cl.
CPC ............ *G06F 30/31* (2020.01); *G06F 30/12* (2020.01); *G06F 30/30* (2020.01); *G06F 30/398* (2020.01); *H05K 3/0005* (2013.01); *G06F 2115/12* (2020.01)

(58) Field of Classification Search
CPC ........................................... G06F 30/31
USPC .......................................... 716/102
See application file for complete search history.

(56) References Cited

U.S. PATENT DOCUMENTS

| | | |
|---|---|---|
| 6,760,890 B2 | 7/2004 | Makinen |
| 7,015,711 B2 | 3/2006 | Rothaug et al. |
| 7,149,342 B2 | 12/2006 | Biazik et al. |
| 7,248,757 B2 | 7/2007 | Iwasaki |
| 7,821,278 B2 | 10/2010 | Romanov et al. |
| 8,499,275 B2 | 7/2013 | Tsuchiya et al. |
| 8,645,900 B2 | 2/2014 | Schroeder et al. |

(Continued)

FOREIGN PATENT DOCUMENTS

| | | |
|---|---|---|
| CN | 109963455 B | 7/2020 |
| WO | WO2020/202155 A1 | 10/2020 |

OTHER PUBLICATIONS

CF24410 4xSPST switch array specification sheet, 2019, Innovative Micro Technology, Inc.

(Continued)

*Primary Examiner* — Eric D Lee
(74) *Attorney, Agent, or Firm* — Carlos R. Villamar; The Villamar Firm PLLC

(57) ABSTRACT

A system, method and computer program product for automated circuit trace generation and reconfiguration on a circuit board, includes a circuit board having a plurality of contact points; a switching matrix coupled to the contact points of the circuit board, and connected to a computer. The switching matrix is programmed by the computer to generate one or more circuit traces onto the contact points of the circuit board.

18 Claims, 14 Drawing Sheets

(56) References Cited

U.S. PATENT DOCUMENTS

| | | |
|---|---|---|
| 10,055,530 B1 | 8/2018 | Sinivaara et al. |
| 10,372,863 B2 | 8/2019 | Burke et al. |
| 10,430,538 B2 | 10/2019 | Laing |
| 10,592,704 B2 | 3/2020 | Brookshire |
| 10,952,328 B2 | 3/2021 | Schneider |
| 2020/0103870 A1* | 4/2020 | Small ................... H05K 1/18 |

OTHER PUBLICATIONS

Engaging Amateurs in the Design, Fabrication, and Assembly of Electronic Device, D. Mellis et al., DIS '16: Proceedings of the 2016 ACM Conference on Designing Interactive Systems 1270-1281, Jun. 2016, available on world wide web at dl.acm.org/doi/pdf/10.1145/2901790.2901833.

Plain2Fun: Augmenting Ordinary Objects with Interactive Functions by Auto-Fabricating Surface Painted Circuits, T. Wang et al., DOI: 10.1145/3196709.3196791, 1095-1106, Jun. 2018.

\* cited by examiner

SYSTEM AND METHOD FOR TRACE GENERATION AND RECONFIGURATION ON A BREADBOARD OR PRINTED CIRCUIT BOARD

The present invention is a continuation of U.S. patent application Ser. No. 17/500,804 of Albert Moses HAIM, entitled "SYSTEM AND METHOD FOR TRACE GENERATION AND RECONFIGURATION ON A BREADBOARD OR PRINTED CIRCUIT BOARD," filed on 13 Oct. 2021, now allowed, the entire disclosure of which is hereby incorporated by reference herein.

BACKGROUND OF THE DISCLOSURE

Field of the Disclosure

The present disclosure generally relates to circuit boards, breadboards, and the like, and more particularly to a method and system for printed circuit boards, breadboards, and the like, having reconfigurable traces, circuit lines, and the like.

Discussion of the Background

Whether using a breadboard in electronics hobby, educational scenario or a company lab, building a circuit with a breadboard and translating the connections to a printed circuit board (PCB) can be challenging. Sometimes connections are missed or mismatched when drawing up a circuit based on a breadboard design. This is especially true if you have large numbers of jumper wires. If you are building a breadboard circuit based on a circuit simulator design, or just working from a paper design, or are ready to take the breadboard design to the computer for simulation or PCB manufacture, translation errors often occur. The time spent in circuit design, troubleshooting and manufacture can be lengthy using these current implements. Even when you have reached the PCB stage in your design, there could be flaws in the trace design, or flawed discrete components over time, rendering the PCB a waste, specifically called e-waste, for electronics waste, which contributes to major pollution of the planet.

SUMMARY OF THE DISCLOSURE

Therefore, there is a need for a method and system that addresses the above and other problems. The above and other problems are addressed by the illustrative embodiments of the present disclosure, which provide a smart breadboard, or smart printed circuit board which can connect to a computer, such that the computer software and user can download trace geometry onto said smart breadboard or smart printed circuit board. In this fashion, no jumper wires are needed, or are greatly reduced. Also, the traces designed on the computer can easily be verified on the smart breadboard or smart printed circuit board, and a regular, more inexpensive printed circuit board can be made with assurance that the connections are valid. Time making and troubleshooting circuits is saved with this methodology.

Accordingly, in illustrative aspects of the present disclosure there is provided a system, method and computer program product for a computer-aided system for automated circuit trace generation and reconfiguration on a circuit board, including a circuit board having a plurality of contact points; a circuit loaded on the circuit board; a switching matrix coupled to the contact points of the circuit board, and connected to a computer, wherein the switching matrix is programmed by the computer to generate one or more circuit traces onto the contact points of the circuit board; and a power control circuit for powering the circuit, and the switching matrix on and off in a controlled manner, wherein the power control circuit is configured to first power down the circuit on the circuit board before powering down the switching matrix, and the power control circuit is configured to first power up the switching matrix before powering up the circuit on the circuit board.

The switching matrix is a photoconductive switching matrix driven by a video imager.

The video imager is configured to create circuit traces on the photoconductive switching matrix, including at least one of changing a width of each of the traces, controlling a voltage or current flowing through the traces.

The computer is configured to upload or download trace geometries over a communications network.

The system, method and computer program product can include a wireless pen coupled to the computer and configured to draw traces on an overlay projected onto the circuit board.

The system, method and computer program product can include a computer enabled voice assistant configured to aid in at least one of circuit design, and troubleshooting.

Still other aspects, features, and advantages of the present disclosure are readily apparent from the following detailed description, by illustrating a number of illustrative embodiments and implementations, including the best mode contemplated for carrying out the present disclosure. The present disclosure is also capable of other and different embodiments, and its several details can be modified in various respects, all without departing from the spirit and scope of the present disclosure. Accordingly, the drawings and descriptions are to be regarded as illustrative in nature, and not as restrictive.

BRIEF DESCRIPTION OF THE DRAWINGS

The embodiments of the present disclosure are illustrated by way of example, and not by way of limitation, in the figures of the accompanying drawings and in which like reference numerals refer to similar elements and in which:

FIG. 1 is an illustrative overview of a smart breadboard or smart printed circuit board (e.g., solderboard, and the like) and components thereof, enabling trace reconfiguration, visualization of traces, and the like;

FIG. 5 is an illustrative example of an embodiment of a switching matrix, using PhotoMOS technology, and the like;

FIG. 6 is an illustrative example of an embodiment of a switching matrix, using phototransistors in a TRIAC configuration, and the like;

FIG. 7 is an illustrative example of an embodiment of a switching matrix, using Micro-Electro-Mechanical Systems (MEMS) photo-coupled switches, and the like;

FIG. 8 is an illustrative example of an embodiment of a switching matrix, using optocoupler switches, and the like;

FIG. 12 is an illustrative web application that supports a smart breadboard or smart printed circuit board as Internet of Things (IoT) with various features, functionality, and the like; and FIGS. 13A-13B are an illustrative example of software logic that determines how to fix a circuit on a smart breadboard using reconfigurable traces and integrated test and measurement devices, when something is wrong with the circuit on a smart breadboard or smart PCB, and the like.

DETAILED DESCRIPTION OF THE PREFERRED EMBODIMENTS

Figure 1:
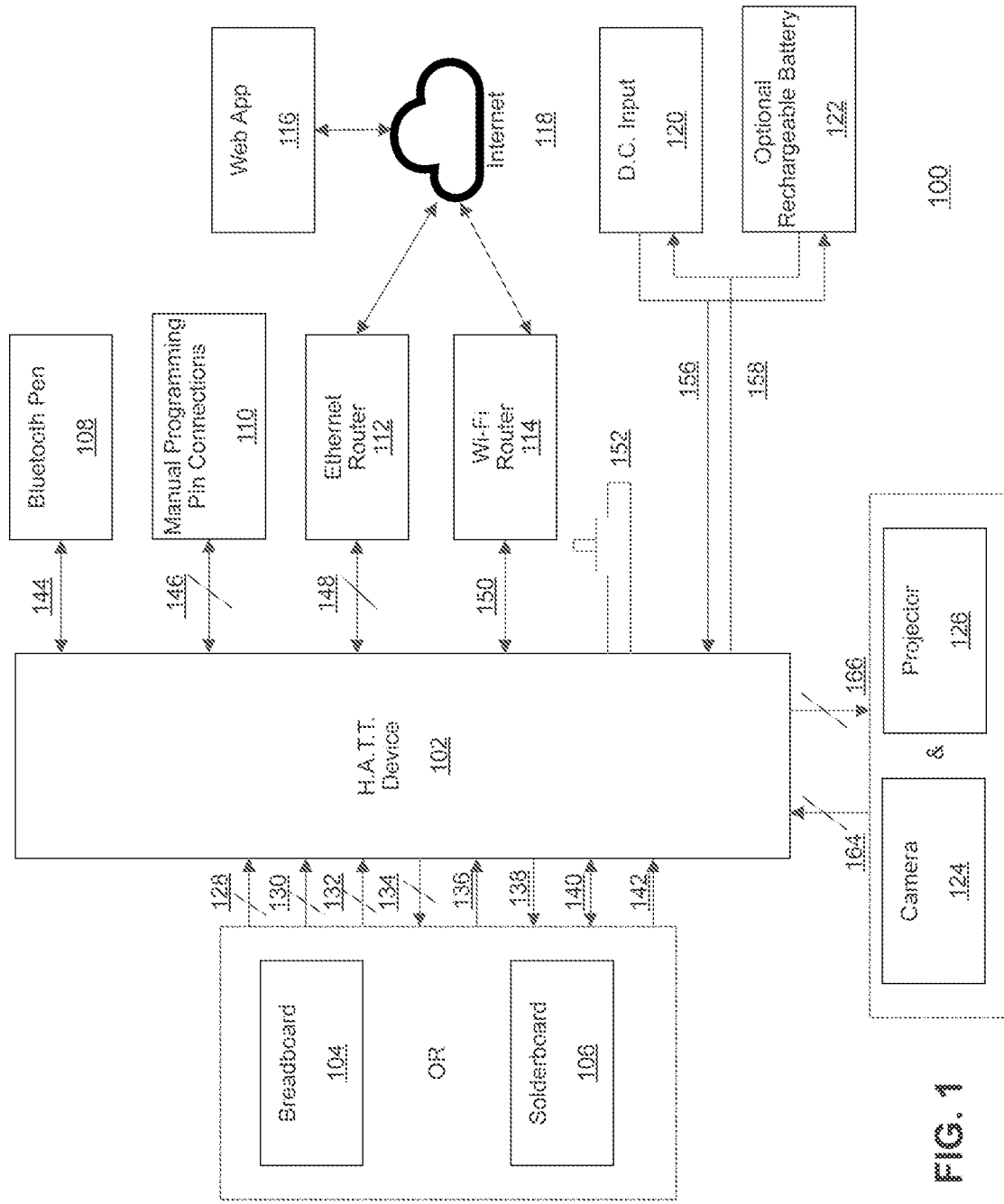

Referring now to the drawings, wherein like reference numerals designate identical or corresponding parts throughout the several views, and more particularly to FIG. 1 thereof, there is illustrated an overview of the smart breadboard or smart printed circuit board (e.g., a solderboard, and the like) and its components, enabling the method and system for trace reconfiguration, and visualization of the traces, according to an illustrative embodiment. In FIG. 1, system 100 shows a H.A.T.T. device 102 connected to a web application 116 across the internet 118 via connection 148 to ethernet router 112, or via wireless connection 150 to Wi-Fi router 114. The web application 116, which can be implemented with Bubble.io or the like, serves to draw circuit traces on a computer, among other things, which can then be downloaded to the H.A.T.T. device 102, which are then translated to circuit traces or trace geometry on the breadboard 104 or solderboard 106, via connections 134. A Bluetooth pen 108 , and the like, wirelessly connected via 144 can also serve to draw traces on the breadboard 104 or solderboard 106, which can be seen by a projection of those traces by projector 126 onto the breadboard 104 or solderboard 106. Alternatively, trace geometry can be uploaded onto the H.A.T.T. device 102 via manual programming pin connections 110, connected via 146. To view trace geometry on the breadboard 104 or solderboard 106, a camera 124 connected via 164 and projector 126 connected via 166 are employed to align and project the trace geometry onto the breadboard 104 or solderboard 106. To turn the H.A.T.T. device 102 on or off, there is a switch 152, which, when pressed once, turns the H.A.T.T. device 102 on, and when pressed twice, turns it off. Power to the H.A.T.T. device 102 can be sourced by a D.C. Input 120, or a rechargeable battery 122, connected to terminals 156 and 158. In order to detect circuit failure on breadboard 104, solderboard 106, the H.A.T.T. device 102 can employ a thermistor array, connected via 128. This array detects overheating of components, and allows evasive action to be taken by means of automatically changing trace geometry, to other redundant components on the breadboard 104, solderboard 106. In the same manner, other signals, such as connection 130, a multimeter signal input, and 132, a digital oscilloscope input can be employed to check circuitry on breadboard 104, solderboard 106, to test if the circuit and components are working properly, and take action by reconfiguring trace geometry as needed. Connection 136 is a "Help" button input to H.A.T.T. device 102, from the circuit on breadboard 104, solderboard 106, which is pressed by user to initiate a process of self-analysis to fix any problems on said circuit, or H.A.T.T. device 102. Connection 138 is an output to power on the circuit on breadboard 104, solderboard 106, after trace geometry has been completely configured. Connection 140 is both an output to and input from breadboard 104, solderboard 106, to turn off the circuit residing on the same, or to turn off the H.A.T.T. device 102, after the aforementioned circuit turns off. Input 142 is an error signal input, telling the H.A.T.T. device 102 that there is something wrong with the circuit residing on the breadboard 104, or solderboard 106.

Figure 2:
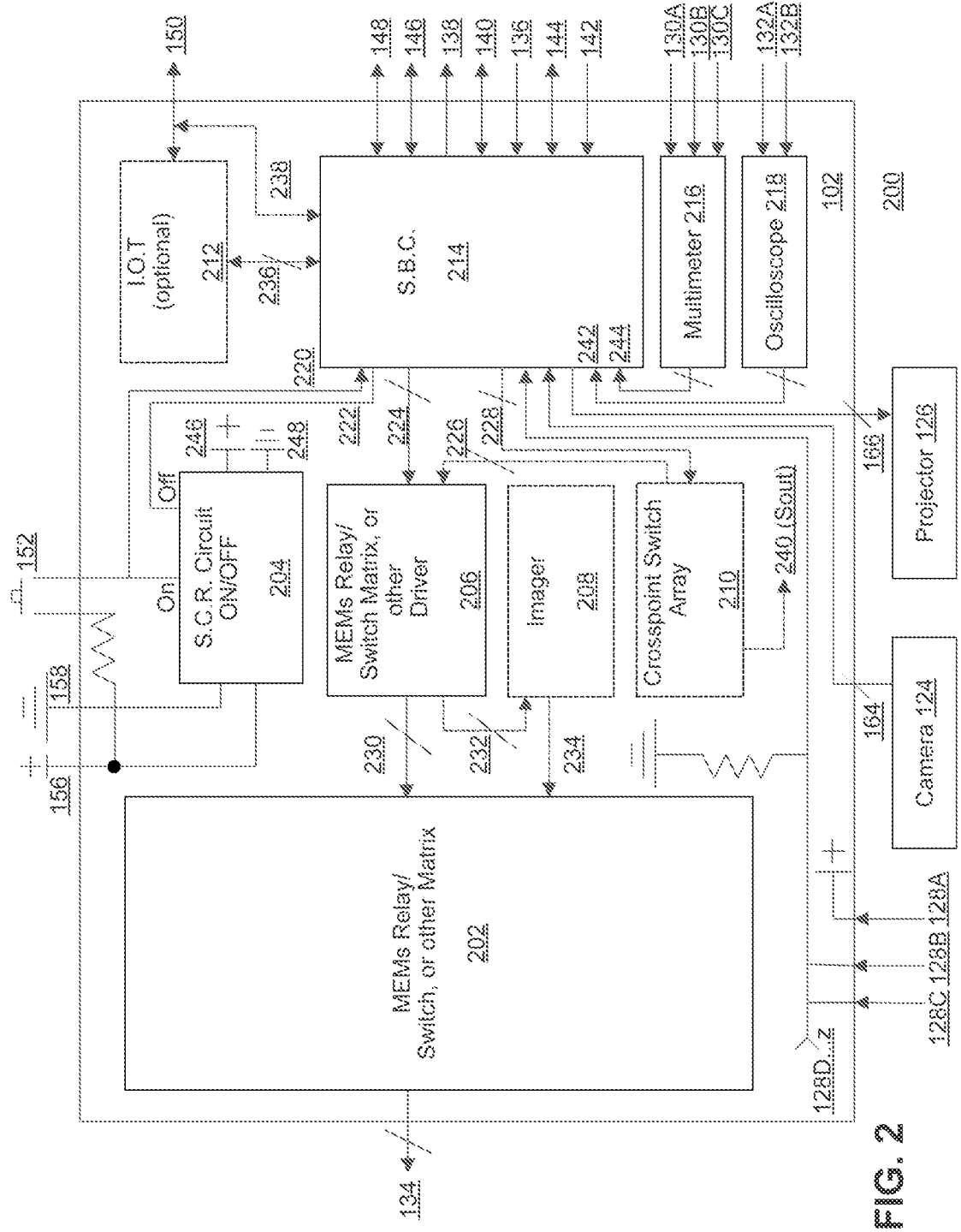
FIG. 2 is an illustrative more detailed overview of hardware employed to enable trace reconfiguration, as well as integrated test instruments.

FIG. 2 illustrates a more detailed overview of the hardware employed to enable trace reconfiguration, as well as integrated test instruments. In FIG. 2, system 200 shows a single board computer (SBC) 214 which could be a Raspberry Pi 3B+ connected optionally via 236 to a Bolt Internet of Things (IOT) device 212, if the SBC 214 is not already configured as a Bolt I.O.T. The Bolt I.O.T. 212, or optionally the SBC 214, connects via 150, or optionally 238 and 150, wirelessly to Wi-Fi Router 114, then to the internet 118 and to web application 116. The SBC 214 connects via connection 224 to the Micro Electrical Machine (MEMs) relay or switch matrix driver 206, which in turn drives the MEMs relay/switch matrix 202 via connection 230. The trace geometry is then passed via connections 134 to the breadboard 104, or solderboard 106. Depending on the switch matrix 202 embodiments, a crosspoint switch array 210 such as AD75019 by Analog Devices, can be employed to enable individual chip drivers 206 attached to the switches in switch matrix 202, as in the case of MEMs chip (e.g., a CF24410 Cenfire switch array by Atomica, and the like). The crosspoint switch array 210 can connect to the SBC via connection 228, to the driver(s) via connection 226, and can be expanded to include a plurality of crosspoint switch arrays as necessary via connection 240. In an alternative embodiment, switch matrix 202 could be an F.P.G.A, or A.S.I.C. In another alternative embodiment of switch matrix 202, wherein the switches are photo-coupled, a driver 206, connected via 232 to an imager 208 can be employed to draw traces with light under the photo-coupled switches via connection 234, thereby activating the switch matrix 202 where the light from the imager 208 illuminates the individual photodetectors, to create trace geometry. The imager 208 can be LCD, DLP, LCOS, DMD, LED, OLED, or other video technology. In the same vein, the photo-coupled switches and imager could be implemented on a silicon optical bench. A Silicon-Controlled Rectifier (SCR) circuit 204 turns the H.A.T.T. device 102 on or off, via switch 152, or connection 220 or 222. The load of H.A.T.T. device 102 can be sourced by connections 246 and 248. Pressing button 152 once turns the H.A.T.T. device 102 on, and pressing it twice sends a signal to SBC 214 through connection 220, to first turn off the circuit on breadboard 104, or solderboard 106, if one exists, via connection 140, then turn itself off via connection 222. A digital multimeter 216 can be employed via connection 244 to SBC 214 to test voltage, current, conductance, resistance, capacitance, inductance, and whether a transistor, SCR or diode on the breadboard 104, or solderboard 106 circuit is good or bad. A digital oscilloscope 218 can be employed via connection 242 to SBC 214 to test the signals on a circuit on breadboard 104, or solderboard 106.

Figure 3:
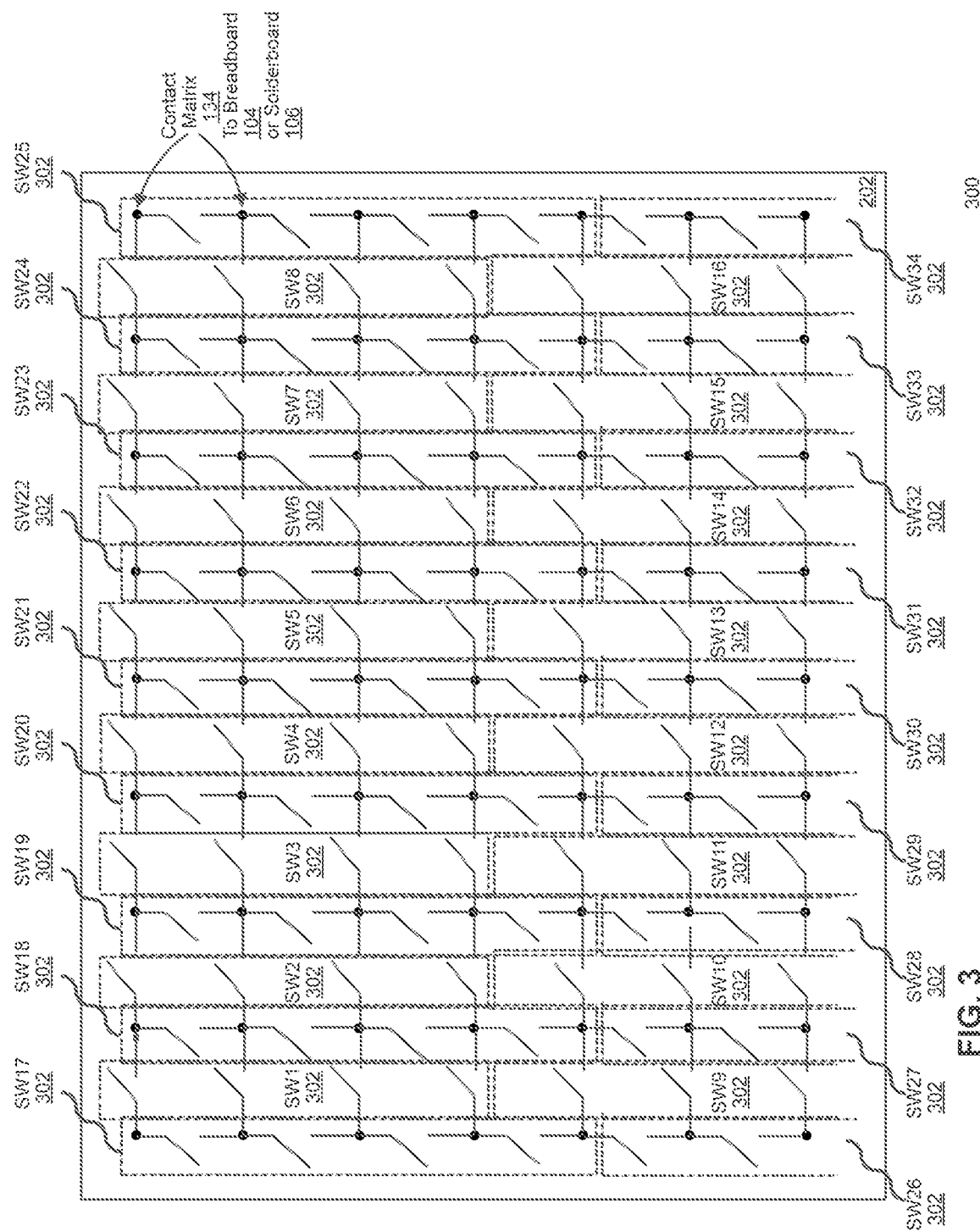
FIG. 3 is an illustrative view of a switching matrix employed to enable trace geometries on a smart breadboard or smart printed circuit board.

FIG. 3 illustrates the switching matrix employed to enable the trace geometries on the smart breadboard or smart printed circuit board. In FIG. 3, system 300 shows an array of switches inside switching matrix 202 including switch 302 in an advantageous configuration, such that when closed, trace geometries are formed between contact matrix connections 134, on the breadboard 104, or solderboard 106. Trace geometries can be made in the x and y directions like a two-dimensional Cartesian coordinate system. Diagonal traces can be made by switching alternately vertically and horizontally, such as in a "staircase" fashion. The smaller the switch 302, the denser the contact matrix connections 134, which result in more possible traces per square inch of breadboard 104, or solderboard 106. In order to make the switch array, and by extension the breadboard 104 or solderboard 106 contact matrix 134 denser, a silicon optical bench can be used, along with Through Silicon Vias (TSV) and Silicon Interposers. Switch 302 is shown as a four-switch discrete MEMs chip (e.g., a CF24410 Cenfire switch array by Atomica, and the like). This chip was selected for its bi-directional nature, small size, low resistance, and low parasitic capacitance-traits necessary for a smart breadboard to work. However, other switch embodiments can be made into a suitable array for breadboard 104, or solderboard 106, as discussed in the description of FIG. 2, with similar advantageous traits.

Figure 4:
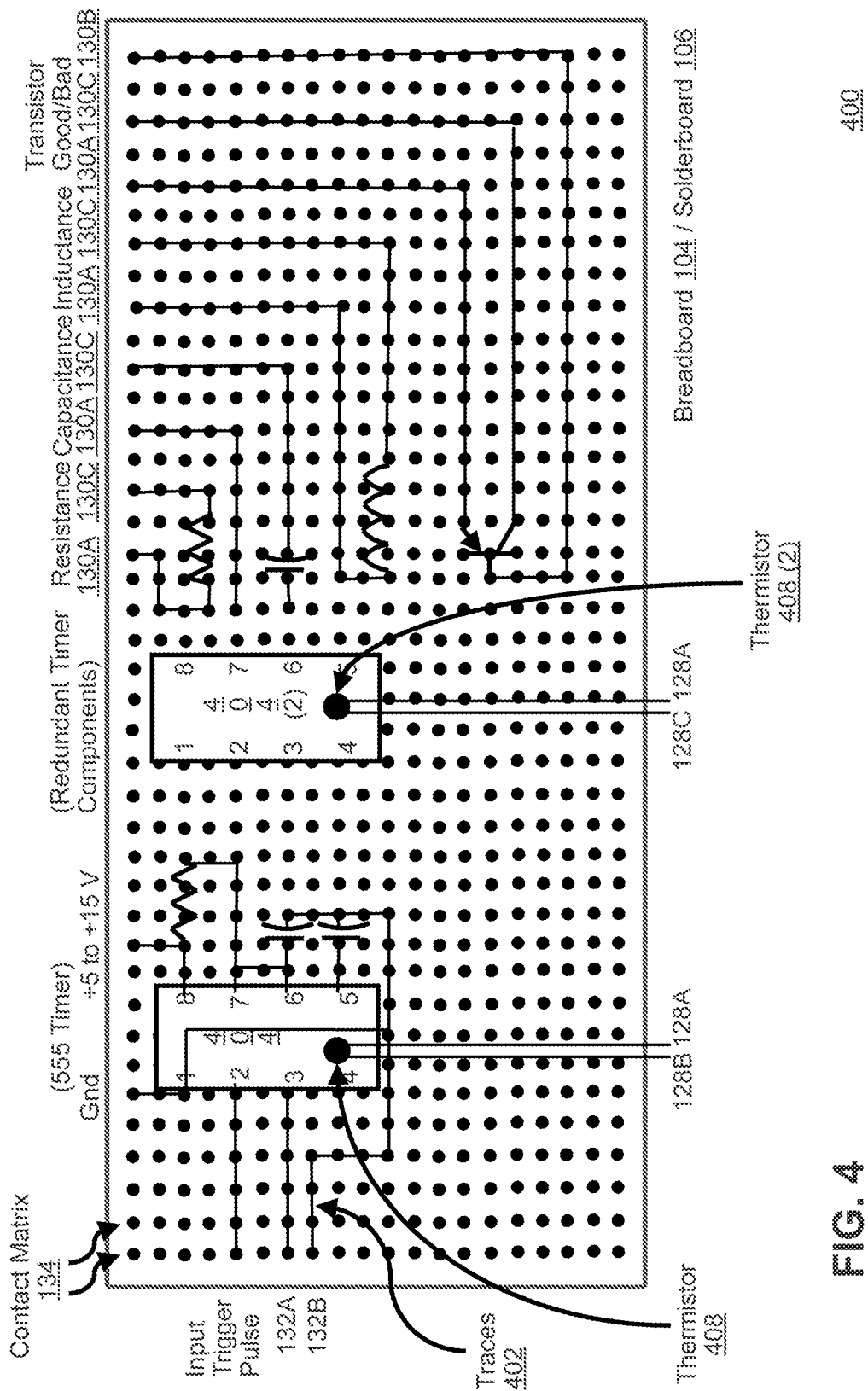
FIG. 4 is an illustrative view of a smart breadboard or smart printed circuit board, with components attached and connected via generated reconfigurable traces.

FIG. 4 is an illustrative view of the smart breadboard or smart printed circuit board, with components attached and connected via the generated reconfigurable traces. In FIG. 4, system 400 shows traces 402, between points on contact matrix 134, connecting a 555 timer chip 404 to capacitors and a resistor. An oscilloscope 218 receives a signal output from timer 404, connected via inputs 132A and 132B, to traces 402. Thermistors 408, 408 (2) sit on chip 404, 404 (2) respectively to output signals to the SBC 214, via connections 128B, 128A and 128C, 128A respectively. The thermistors are there to detect overheating of the chips 404, 404 (2). A redundant timer chip 404 (2) can be placed in case chip 404 overheats. In this case, chip 404 would be disconnected by the reconfigurable traces 402 and chip 404 (2) would be connected to take its place by other traces 402. Multimeter 216 can also be connected to the circuit on breadboard 104, or solderboard 106, via 130A, 130C and 130B to traces 402, connecting one at a time each to a resistor, capacitor, inductor, transistor, to measure resistance, capacitance, inductance, or whether a transistor is still working, respectively. Multimeter 216 can also connect via 130A, 130C to traces 402 to measure conductance, voltage, current, or whether a diode or SCR works.

Figure 5:
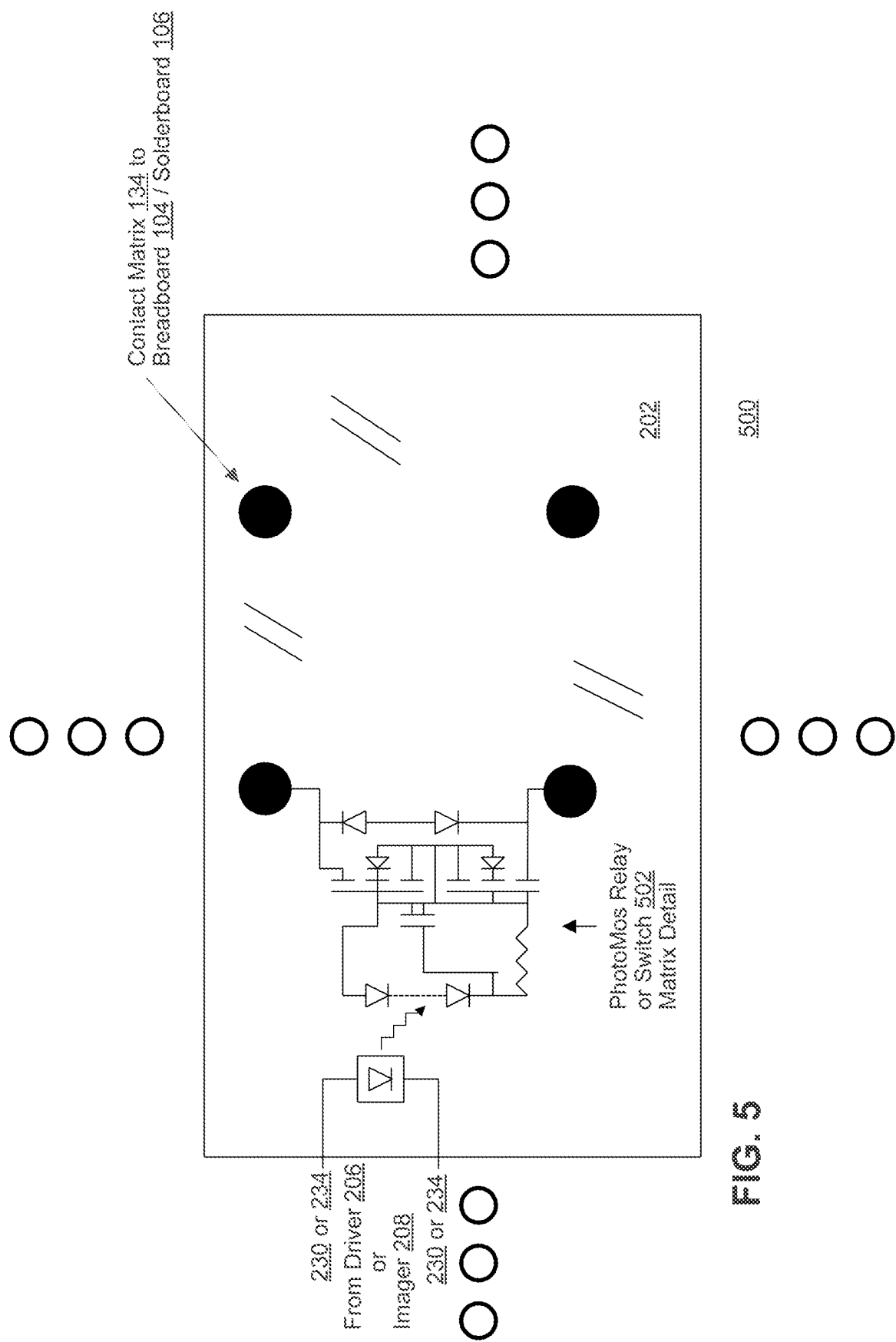

FIG. 5 illustrates an example of another embodiment of the switching matrix, using PhotoMOS technology. In FIG. 5, system 500 shows a PhotoMOS relay or switch 502, connected to the contact matrix 134. This switch 502 can be driven by a driver 206, via connection 230, or alternatively via the light output of an imager 208, connection 234.

Figure 6:
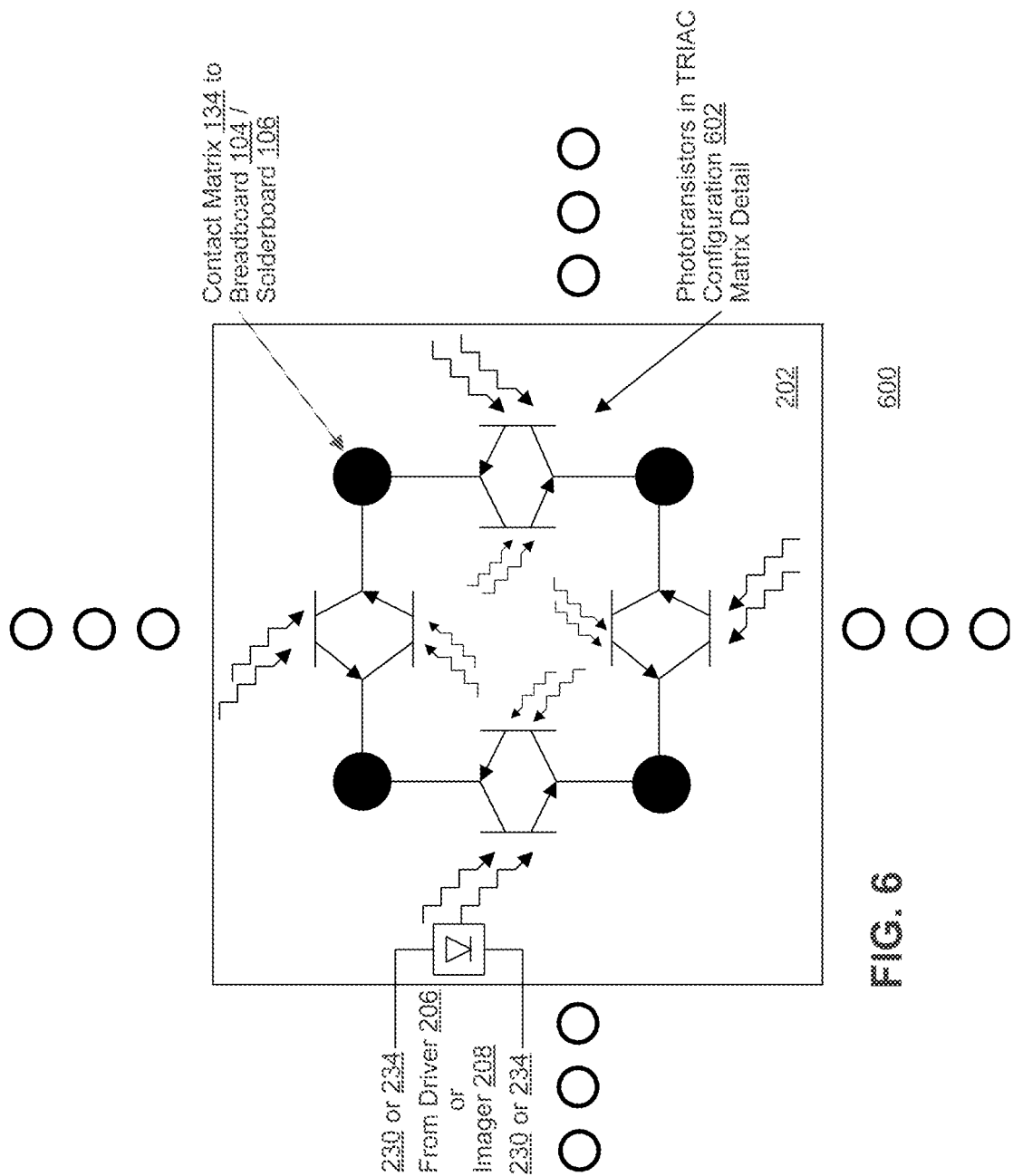

FIG. 6 illustrates an example of another embodiment of the switching matrix, using phototransistors in a TRIAC configuration. In FIG. 6, system 600 shows a phototransistor TRIAC switch 602, connected to the contact matrix 134. This switch 602 can be driven by a driver 206, via connection 230, or alternatively via the light output of an imager 208, connection 234.

Figure 7:
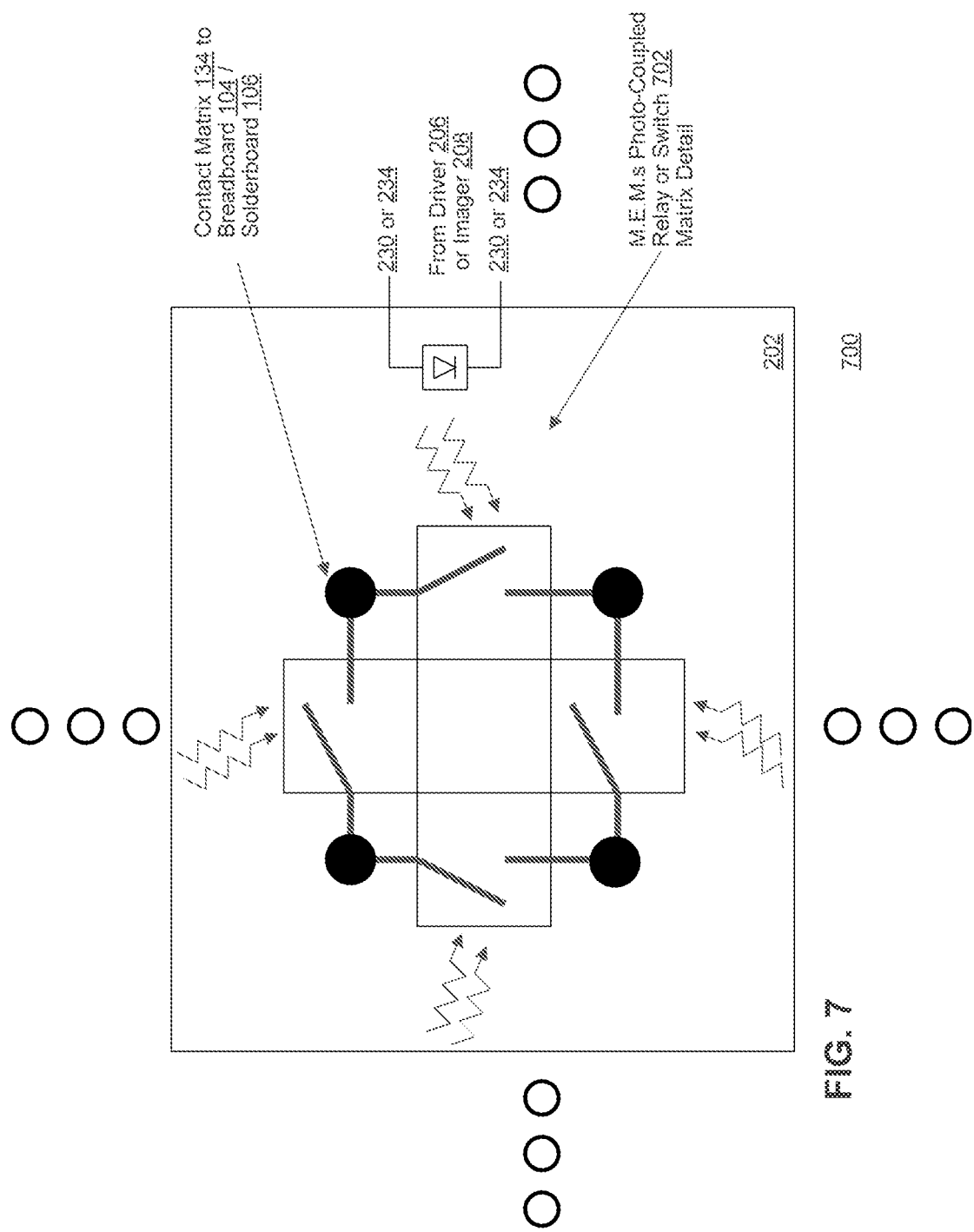

FIG. 7 illustrates an example of another embodiment of the switching matrix, using a MEMs photo-coupled relay or switch. In FIG. 7, system 700 shows a MEMs photo-coupled relay or switch 702, connected to the contact matrix 134. This switch 702 can be driven by a driver 206, via connection 230, or alternatively via the light output of an imager 208, connection 234.

Figure 8:
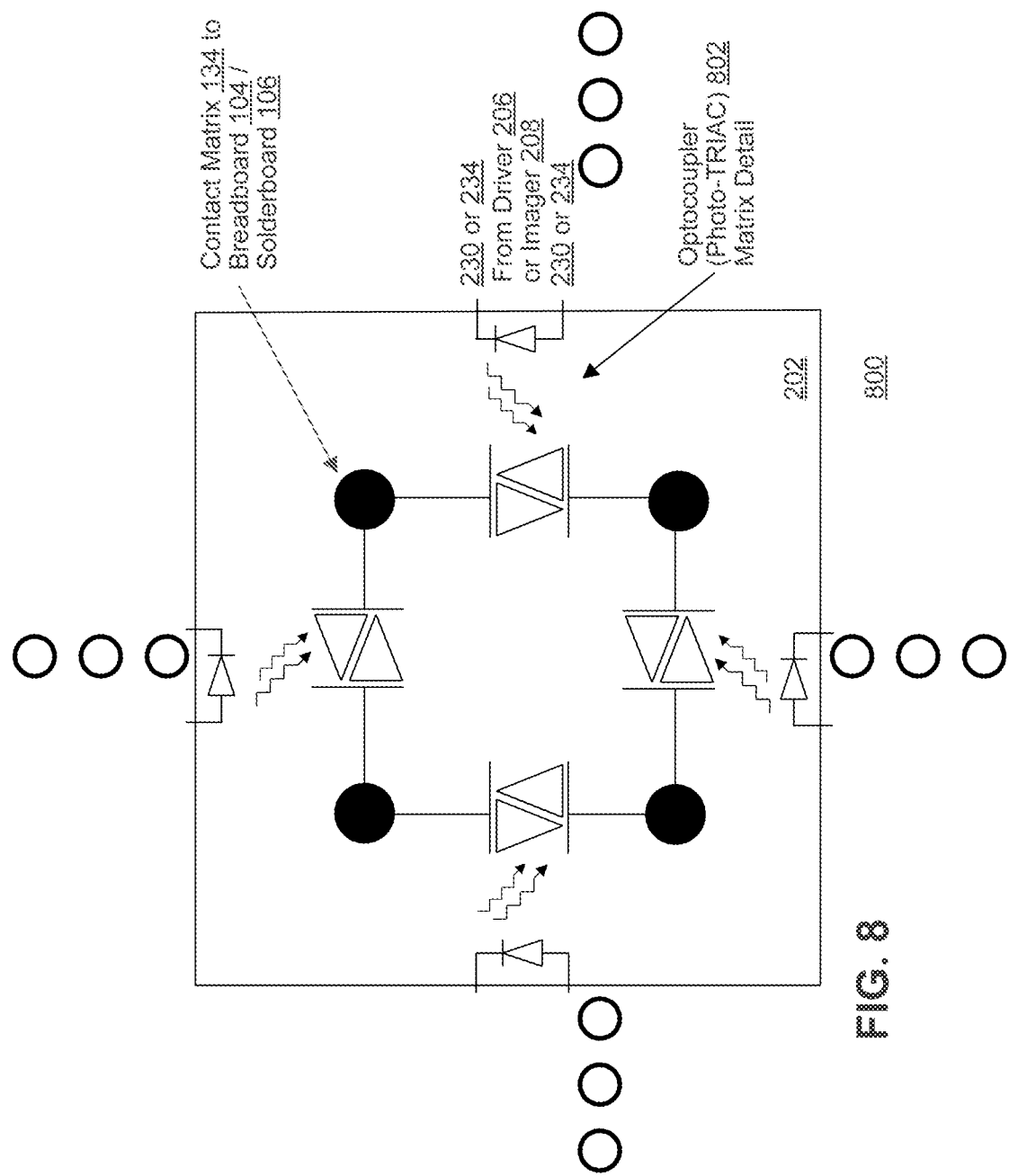

FIG. 8 illustrates an example of another embodiment of the switching matrix, using an optocoupler or photo-TRIAC. In FIG. 8, system 800 shows an optocoupler 802, connected to the contact matrix 134. This switch 802 can be driven by a driver 206, via connection 230, or alternatively via the light output of an imager 208, connection 234.

Figure 9:
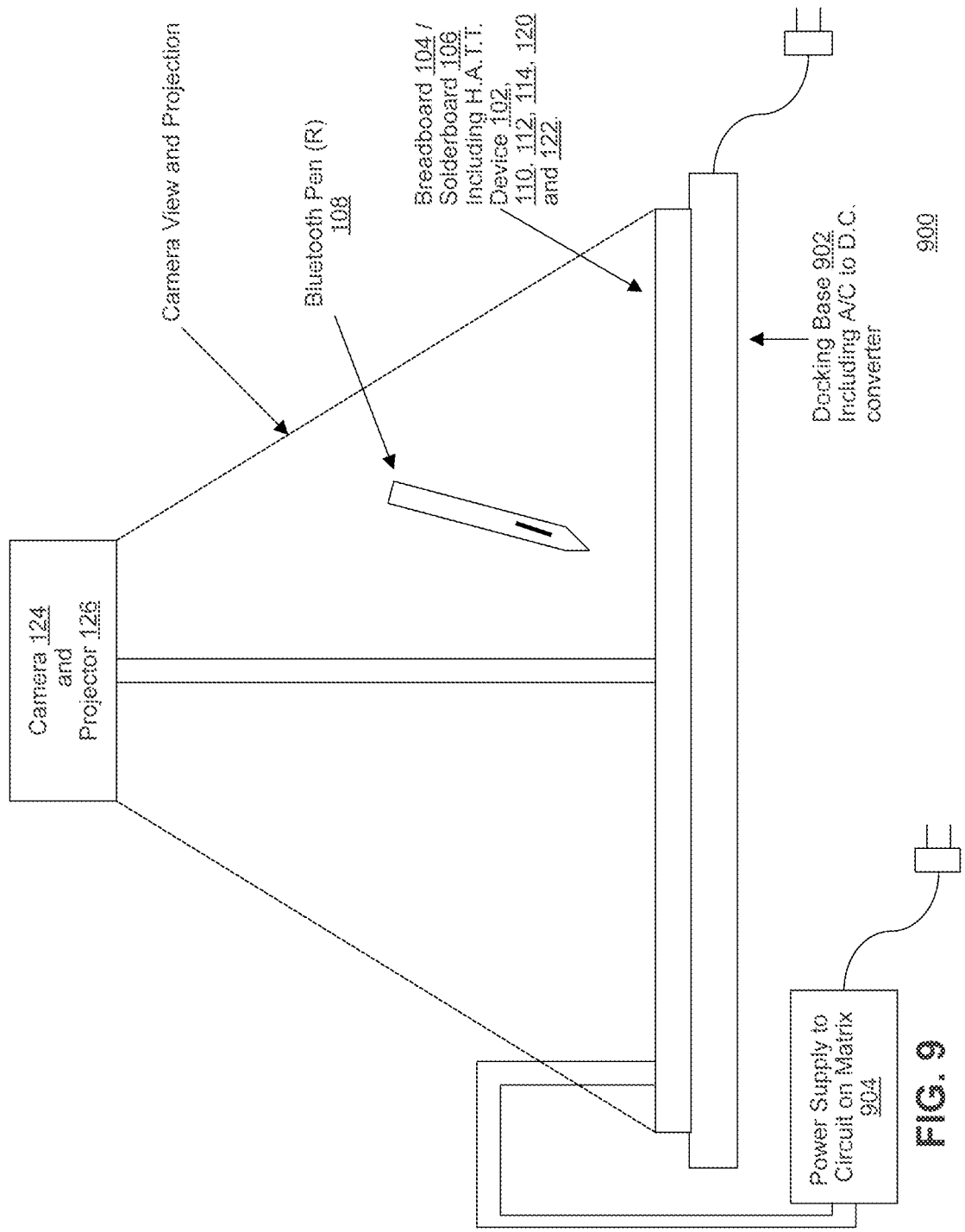
FIG. 9 is an illustrative view of a workbench configuration used to design circuitry employing a smart breadboard or smart printed circuit board.

FIG. 9 illustrates the workbench configuration used to design circuitry employing the smart breadboard or smart printed circuit board. In FIG. 9, system 900 shows docking base 902, which includes an alternating current (AC)/direct current (DC) converter to power the H.A.T.T. device system 100, and a support and attachment for the camera 124 and projector 126. A separate power supply 904 can be used to power the circuit on the breadboard 104, or solderboard 106.

Figure 10:
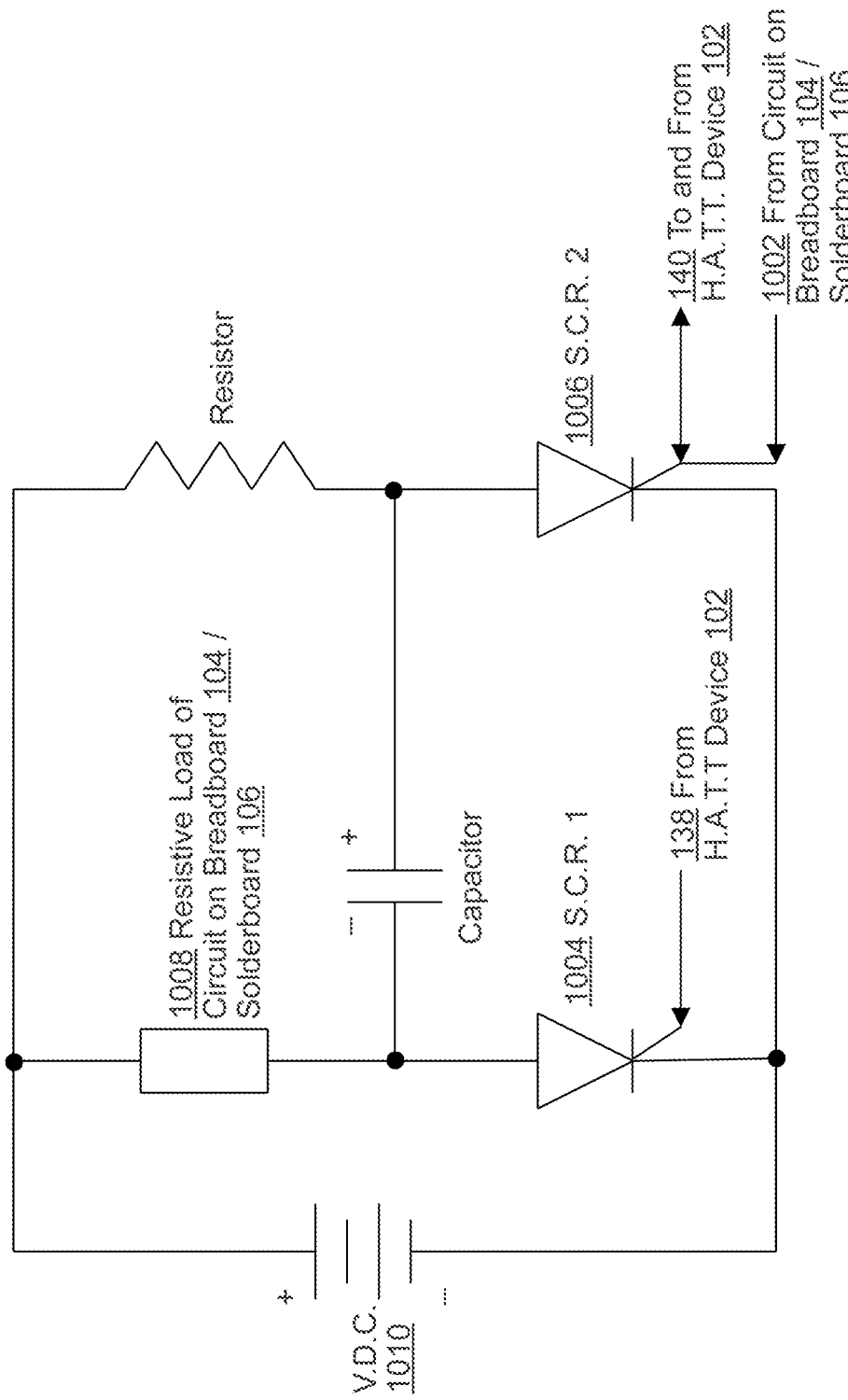
FIG. 10 is an illustrative example of a circuit implemented on a smart breadboard, to turn on/off the circuit on the breadboard by the smart breadboard, or alternatively turn off the smart breadboard by the circuit on the smart breadboard.

FIG. 10 illustrates an example of a circuit implemented on the smart breadboard to turn on/off the circuit on the breadboard, by the smart breadboard, or alternatively turn off the smart breadboard by the circuit on the smart breadboard. In FIG. 10, system 1000 shows connection 1002 from the circuit on breadboard 104, or solderboard 106, which both turns off SCR 1006, and by extension the load of the circuit 1008, and signals to H.A.T.T. device 102 to turn off, via connection 140. The H.A.T.T. device 102 can also send a signal via 140 to turn off SCR 1006, which turns off the power to the circuit load 1008. SCR 1004 can be triggered by connection 138, from H.A.T.T. device 102, to turn power on to the circuit load 1008. In any case, power to the H.A.T.T. device 102 should be turned on first, to configure the switch matrix 202, to configure the contact matrix 134, setting the circuit trace geometry 402 before the circuit load 1008 turns on. Power V.D.C. 1010 to the circuit on breadboard 104 or solderboard 106 can come from power supply 904, or a battery.

Figure 11:
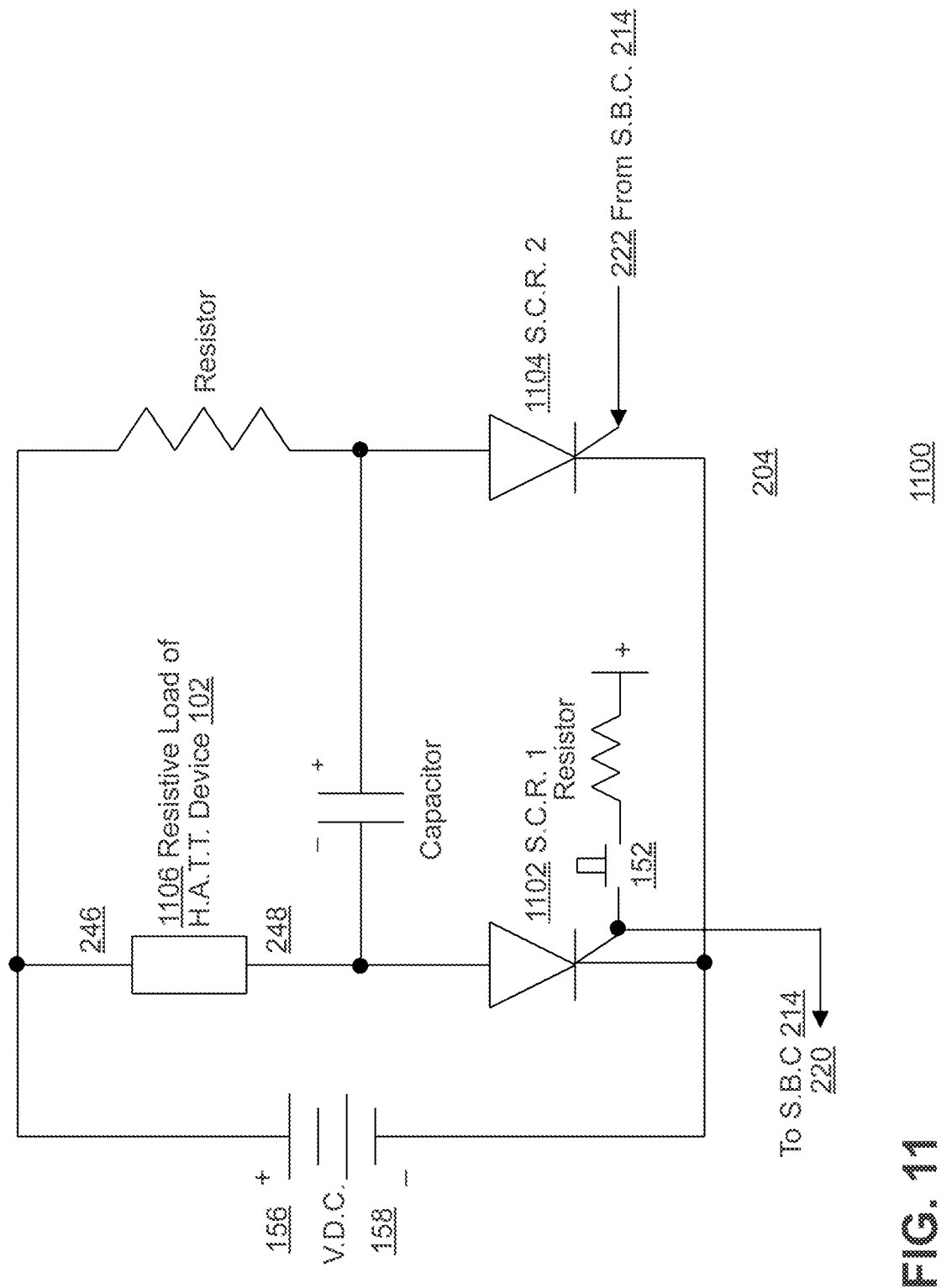
FIG. 11 is an illustrative example of a circuit within a smart breadboard to power it on, or power it off.

FIG. 11 illustrates an example of a circuit within the smart breadboard to power it on, or power it off. In FIG. 11, system 1100 shows SCR 1102 which can be turned on manually by Switch 152, which turns on the load 1106 of H.A.T.T. device 102, by connections 246 and 248. A signal from SBC 214 via connection 222 to S.C.R 1104 turns off the H.A.T.T. device 102. Pressing button 152 once turns the H.A.T.T. device 102 on by triggering SCR 1102, and pressing it twice sends a signal to SBC 214 through connection 220, to first turn off the circuit on breadboard 104 or solderboard 106, if one exists, via connection 140, then turn itself off via connection 222 which triggers SCR 1104, turning off load 1106, the H.A.T.T. device 102. The proper shutdown sequence is to first shut down the circuit on breadboard 104, or solderboard 106, if once exists, then the H.A.T.T. device 102, which begets the trace geometry 402 on which the circuit sits.

Figure 12:
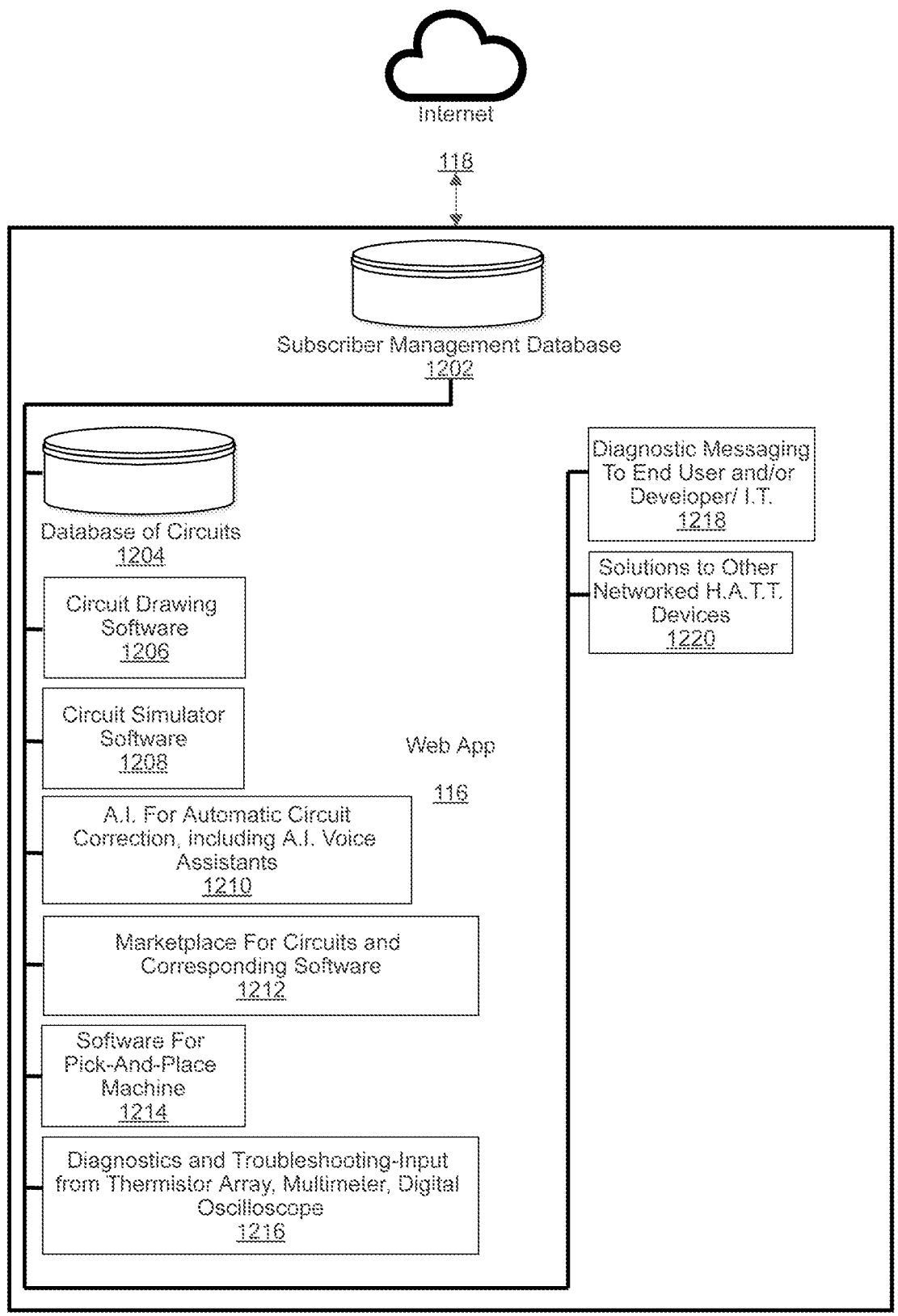

FIG. 12 illustrates a concept of a web application which supports the smart breadboard or smart printed circuit board as an IoT (Internet of Things) with several software functions. In FIG. 12, system 1200 shows a subscriber management database 1202, in web application 116, connected to the internet 118. The subscriber management database 1202 holds all user credentials to access each particular H.A.T.T. device system 100 associated with the user, via username and password. Each subscriber can have access to a database of circuits 1204, which includes circuits developed or acquired by the user. The subscriber also can have access to circuit drawing software 1206, to design trace geometries 402 using a computer interface, or Bluetooth pen 108 directly on the breadboard 104, or solderboard 106. Circuit drawing software 1206 can also show discrete components. To aid in circuit design and component placement on breadboard 104 or solderboard 106, a camera 124 and Projector 126 can be employed, which aid drawing software 1206 to identify discrete components automatically and suggest trace 402 placement, by showing the suggested traces 402 on the computer or by projection 126 on the breadboard 104, or solderboard 106. In photo-coupled embodiments of switch matrix 202, using imager 208, circuit drawing software 1206 can have the option of drawing variable light intensity optical traces, which allow for more or less current/voltage flow in the traces 402. Circuit drawing software 1206 can also output trace design like a Gerber file to create trace geometry 402 onto a regular printed circuit board (PCB). Circuit simulator software 1208 can aid in the design of the real circuit on breadboard 104, or solderboard 106. In photo-coupled embodiments of switch matrix 202, circuit simulator software 1208 can suggest the intensity of light in Imager 208 optical traces to obtain the correct current/voltage flow for traces 402. Advantageously, Artificial Intelligence (AI), which can employ AI Voice Assistants, 1210, can be used for saving time in circuit design or for troubleshooting and correcting finished circuits. Each subscriber in system 1200 also can have access to a marketplace for circuits and corresponding software 1212. In the marketplace 1212, users can purchase or acquire freely trace geometries 402 to download into the database of circuits 1204, and download to H.A.T.T. device system 100, for use on the breadboard 104 or solderboard 106. The acquired trace geometries 402 can be bundled with information about used components to display on circuit drawing software 1206 or circuit simulator software 1208. The acquired trace geometries 402 can also be bundled with corresponding software for the circuit to be placed on breadboard 104, or solderboard 106. The acquired trace geometries 402 can also be bundled with information for a pick-and-place machine. Software for a pick-and-place machine 1214 can also be employed to easily place components onto the smart solderboard 106. Notice that no traces need to be routed, only components placed on a smart solderboard 106, since trace geometry 402 is handled by the integrated H.A.T.T. device system 100. Diagnostics and troubleshooting 1216 can be implemented in system 1200, wherein input connections 128 from a thermistor array, input connections 130 from a multimeter 216, input connections 132 from an oscilloscope 218, "Help" signal input 136, and error signal input 142 are uploaded in real time to web application 116, for visualization of their data, and to commence troubleshooting and diagnostics. Diagnostic messaging 1218 can also be implemented in system 1200, to send error messages or updates to either the end user, developer, I.T. technician or all three. In case there are updated solutions to errors found in the H.A.T.T. system 100 or the circuit it supports on breadboard 104, or solderboard 106, system 1200 can provide solutions to other, similar networked H.A.T.T. devices 1220, across other subscriber accounts in subscriber management database 1202.

Figure 13A:
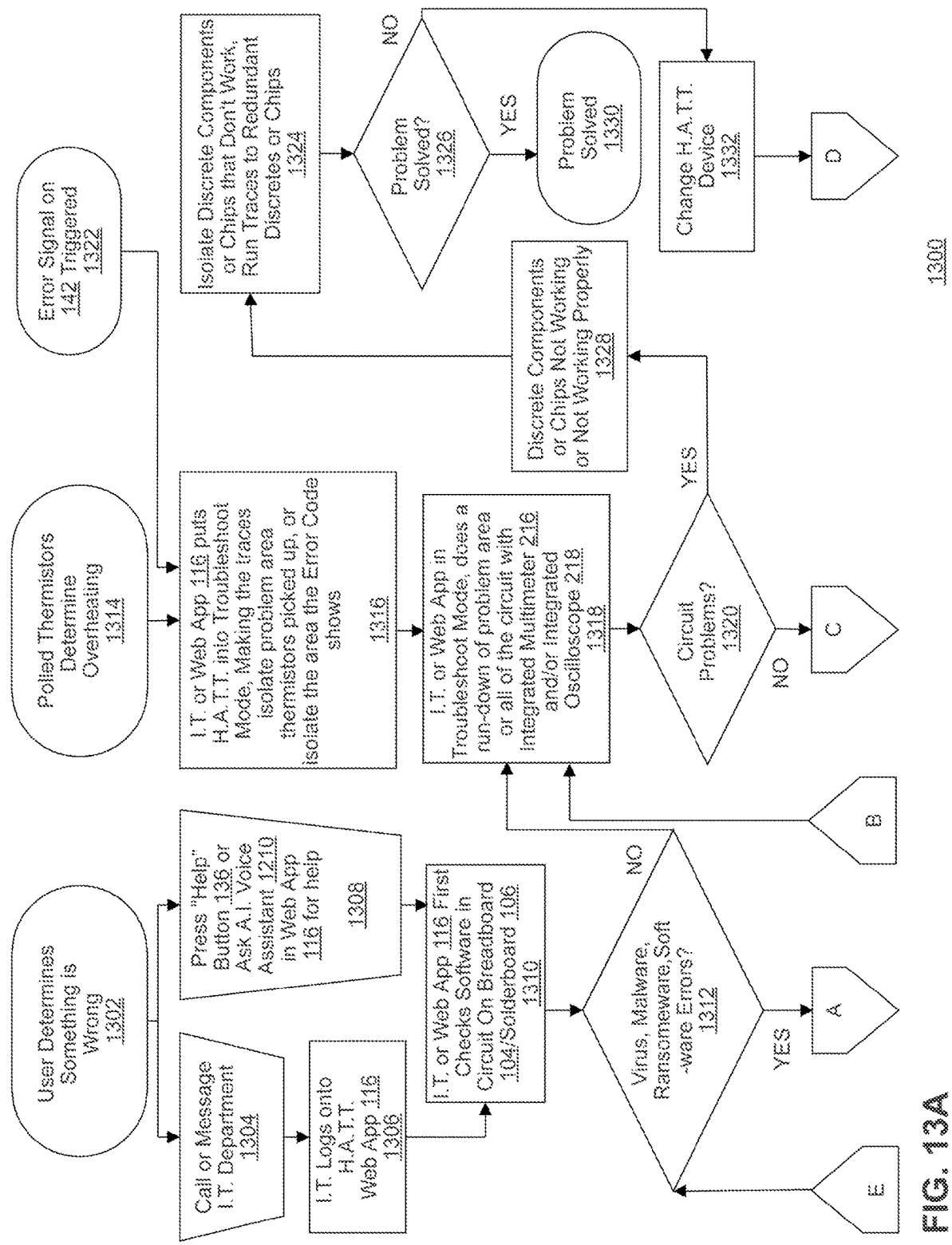
Figure 13B:
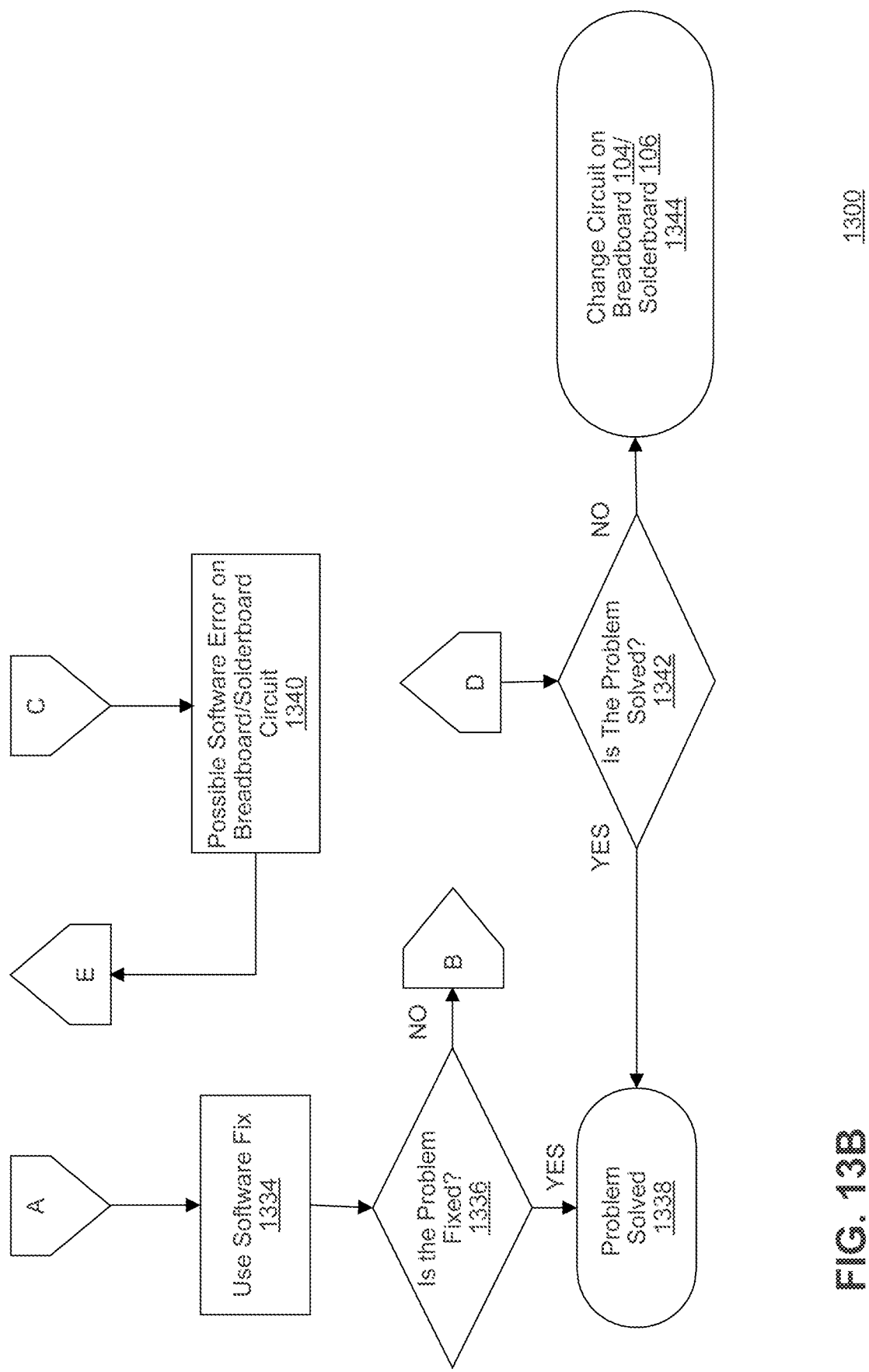

FIG. 13A-13B illustrates an example of the software logic which determines how to fix the circuit on the smart breadboard using reconfigurable traces and integrated test and measurement devices, when something is wrong with said circuit on the smart breadboard or smart PCB. In FIG. 13A-13B, system 1300 shows three entry points to detecting system instability. The first, user determines something is wrong, 1302, with the entire device. The user then manually calls or messages the I.T. department 1304, which then logs into the web app 116, 1306, or the user presses the "Help" button 136, or asks the voice assistant 1210 in web application 116, for help, 1308. Both methods lead to 1310, wherein the I.T. department or web app 116 can first check the software in the circuit on breadboard 104 or solderboard 106. A decision is made whether there are virus, malware, ransomeware or software errors 1312. If YES, then use a software fix 1334 to fix the problem. Is the problem fixed, 1336? If YES, then the problem is solved 1338; The solution is logged into web app 116, in software 1216, updated in database of circuits 1204, and can be sent to other networked H.A.T.T. devices 1220. If NO to either 1312 or 1336, then process 1318 is invoked. Process 1318 involves having I.T. user or web app 116 through software 1216 put the H.A.T.T. device system 100 in troubleshoot mode which does a run-down of the problem area or all of the circuit on breadboard 104, or solderboard 106, with multimeter 216 and/or oscilloscope 218. A decision 1320 is made. Are there any circuit Problems? If NO, then there is a diagnosis of a possible software error in the circuit on breadboard 104, or solderboard 106, 1340, which then leads to decision 1312 again. Are there any virus, malware, ransomware, or software errors? This leads to a loop, until the problem is solved, 1338. If decision 1320 determines YES, there are circuit problems, the diagnosis 1328 is that discrete components or chips are not working, or not working properly, which leads to process 1324. Process 1324 isolates discrete components or chips that don't work, and runs traces to redundant discrete components or chips. Decision 1326 is made. Are the problems solved? If YES, then the problem is solved, 1330; The solution is logged into web app 116, in software 1216, updated in database of circuits 1204, and can be sent to other networked H.A.T.T. devices 1220. If NO, then invoke process 1332, which is to change the H.A.T.T. device system 100. Decision 1342 is reached. Is the problem solved 1342? If YES, then the problem is solved 1338; The solution is logged into web app 116, in software 1216, updated in database of circuits 1204, and can be sent to other networked H.A.T.T. devices 1220. If NO, then change the circuit on breadboard 104, or solderboard 106, 1344; The solution is logged into web app 116, in software 1216, updated in database of circuits 1204, and can be sent to other networked H.A.T.T. devices 1220. The second and third entry points to detecting system instability are that polled thermistors determine overheating 1314, and an error signal on 142 is triggered, 1322. Both these logical entry points coalesce to process 1316. Process 1316 involves having the I.T. user or web app 116 put the H.A.T.T. device 102 in troubleshoot mode, making traces 402 isolate the problem area thermistors detected, or isolate the area on breadboard 104, or solderboard 106 shown by the error signal on 142. This process is followed by process 1318, and the rest of the flowchart as previously mentioned.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present disclosures. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present disclosures, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present disclosures can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present disclosures for performing all or a portion (if processing is distributed) of the processing performed in implementing the disclosures. Computer code devices of the illustrative embodiments of the present disclosures can include any suitable interpretable or executable code mechanism, including but not limited to, scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present disclosures can be distributed for better performance, reliability, cost, and the like.

As stated above, the devices and subsystems of the illustrative embodiments can include computer readable medium or memories for holding instructions programmed according to the teachings of the present disclosures and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present disclosures have been described in connection with a number of illustrative embodiments, and implementations, the present disclosures are not so limited, but rather cover various modifications, and equivalent arrangements, which fall within the purview of pending claims.

What is claimed is:

1. A computer-aided system for automated circuit trace generation and reconfiguration on a circuit board, the system comprising:
   a circuit board having a plurality of contact points;
   a circuit loaded on the circuit board;
   a switching matrix coupled to the contact points of the circuit board, and connected to a computer,
   wherein the switching matrix is programmed by the computer to generate one or more circuit traces onto the contact points of the circuit board; and
   a power control circuit for powering the circuit, and the switching matrix on and off in a controlled manner,
   wherein the power control circuit is configured to first power down the circuit on the circuit board before powering down the switching matrix, and the power control circuit is configured to first power up the switching matrix before powering up the circuit on the circuit board.

2. The system of claim 1, wherein the switching matrix is a photoconductive switching matrix driven by a video imager.

3. The system of claim 2, wherein the video imager is configured to create circuit traces on the photoconductive switching matrix, including at least one of changing a width of each of the traces and controlling a voltage or current flowing through the traces.

4. The system of claim 1, wherein the computer is configured to upload or download trace geometries over a communications network.

5. The system of claim 1, further comprising:
a wireless pen coupled to the computer and configured to draw traces on an overlay projected onto the circuit board.

6. The system of claim 1, further comprising:
a computer enabled voice assistant configured to aid in at least one of circuit design and troubleshooting.

7. A computer-aided method for automated circuit trace generation and reconfiguration on a circuit board, the method comprising:
providing a circuit board having a plurality of contact points;
loading a circuit on the circuit board;
coupling a switching matrix to the contact points of the circuit board, and connecting the switching matrix to a computer;
programming the switching matrix by the computer to generate one or more circuit traces onto the contact points of the circuit board;
powering with a power control circuit the circuit, and the switching matrix on and off in a controlled manner;
first powering down the circuit on the circuit board before powering down the switching matrix with the power control circuit; and
first powering up the switching matrix before powering up the circuit on the circuit board with the power control circuit.

8. The method of claim 7, wherein the switching matrix is a photoconductive switching matrix driven by a video imager.

9. The method of claim 8, further comprising:
creating with the video imager circuit traces on the photoconductive switching matrix, including at least one of changing a width of each of the traces and controlling a voltage or current flowing through the traces.

10. The method of claim 7, further comprising:
uploading or downloading with the computer trace geometries over a communications network.

11. The method of claim 7, further comprising:
coupling a wireless pen to the computer to draw traces on an overlay projected onto the circuit board.

12. The method of claim 7, further comprising:
aiding with a computer enabled voice assistant at least one of circuit design and troubleshooting.

13. A non-transitory computer-readable medium for a computer-aided method for automated circuit trace generation and reconfiguration on a circuit board, and with instructions stored thereon, that when executed by a processor, perform the steps comprising:
providing a circuit board having a plurality of contact points;
loading a circuit on the circuit board;
coupling a switching matrix to the contact points of the circuit board, and connecting the switching matrix to a computer;
programming the switching matrix by the computer to generate one or more circuit traces onto the contact points of the circuit board;
powering with a power control circuit the circuit, and the switching matrix on and off in a controlled manner;
first powering down the circuit on the circuit board before powering down the switching matrix with the power control circuit; and
first powering up the switching matrix before powering up the circuit on the circuit board with the power control circuit.

14. The computer-readable medium of claim 13, wherein the switching matrix is a photoconductive switching matrix driven by a video imager.

15. The computer-readable medium of claim 14, further comprising:
creating with the video imager circuit traces on the photoconductive switching matrix, including at least one of changing a width of each of the traces and controlling a voltage or current flowing through the traces.

16. The computer-readable medium of claim 13, further comprising:
uploading or downloading with the computer trace geometries over a communications network.

17. The computer-readable medium of claim 13, further comprising:
coupling a wireless pen to the computer to draw traces on an overlay projected onto the circuit board.

18. The computer-readable medium of claim 13, further comprising:
aiding with a computer enabled voice assistant at least one of circuit design and troubleshooting.

* * * * *